United States Patent [19]

Sekmakas

[11] 4,113,793

[45] Sep. 12, 1978

[54] RAPID CURING HIGH SOLIDS THERMOSETTING COATINGS

[75] Inventor: Kazys Sekmakas, Des Plaines, Ill.

[73] Assignee: DeSoto, Inc., Des Plaines, Ill.

[21] Appl. No.: 726,141

[22] Filed: Sep. 24, 1976

[51] Int. Cl.² .................... C08L 61/28; C08L 67/02; C08L 67/04

[52] U.S. Cl. .................... 260/850; 260/33.4 R; 427/388 B; 528/273; 528/289; 528/308

[58] Field of Search .................... 260/850, 67.6 R

[56] References Cited

U.S. PATENT DOCUMENTS

| | | | |
|---|---|---|---|
| 3,449,467 | 6/1969 | Wynstra | 260/850 |
| 3,862,072 | 1/1975 | Sekmakas | 260/850 |
| 3,928,265 | 12/1975 | Dhein et al. | 260/850 |

*Primary Examiner*—John C. Bleutge

*Attorney, Agent, or Firm*—Dressler, Goldsmith, Clement, Gordon & Shore, Ltd.

[57] ABSTRACT

A high solids rapid-curing thermosetting solution coating composition containing less than about 30% of volatile organic solvent is provided by a mixture of: (1) an hydroxy functional polyester resin of: (A) 2,2-dimethyl-3-hydroxypropyl-2,2-dimethyl-3-hydroxypropionate; (B) isophthalic acid; and (C) a polyhydric alcohol containing at least three hydroxy groups per molecule and providing from 5 to 25% of the total hydroxy functionality in the polyester; said polyester having an equivalent ratio of hydroxyl to carboxyl functionalities of from 1.35:1 to 2.0:1; (2) liquid low volatile polyhydric alcohol containing from 2-4 hydroxy groups, and (3) liquid hexafunctional melamine resin. In this mixture, the polyester constitutes from about 30 to 70%, the liquid polyhydric alcohol constitutes from 10 to 50%, and the liquid melamine resin constitutes from 15 to 50%.

13 Claims, No Drawings

RAPID CURING HIGH SOLIDS THERMOSETTING COATINGS

The present invention relates to high solids content coating solutions which are particularly adapted for coil coating application because they are characterized by faster cure and lower viscosity than comparable acrylic copolymer-containing systems.

High solids content coating solutions based on a combination of hydroxy functional resin, liquid polyhydric alcohol and aminoplast resin are known, the polyhydric alcohol serving to reduce the proportion of volatile organic solvent needed to provide coating viscosity as taught in U.S. Pat. Nos. 3,267,174 and 3,352,806. The usual hydroxy functional resins are acrylic copolymers, but these produce solutions which are more viscous than desired at the high solids content contemplated, and these solutions do not cure with the desired rapidity.

Oil-modified alkyd resins have also been suggested to provide the hydroxy functional resin, as in U.S. Pat. No. 3,920,595, but these do not provide the high performance associated with acrylic copolymers.

In accordance with this invention, a high solids thermosetting solution coating composition is provided by combining:

(1) an hydroxy functional polyester based on components consisting essentially of diol having a neo-structure, isophthalic acid, and a small proportion of polyhydric alcohol containing at least three hydroxy groups;

(2) a liquid low volatile polyhydric alcohol containing from 2—4 hydroxy groups; and (3) a liquid hexafunctional melamine resin.

Referring first to the hydroxy functional polyester which is employed in this invention, this polyester includes three essential components, namely:

(A) diol having a neo-structure;
(B) an isophthalic acid component; and
(C) a polyhydric alcohol component containing at least three hydroxy groups.

The polyester is an hydroxy functional polyester which is characterized by a definite ratio of hydroxy to carboxy groups in the reactants which are polyesterified in conventional fashion to provide the desired polyester. More particularly, the equivalent ratio of hydroxyl to carboxyl functionality in the polyester is from 1.35:1 to 2.0:1, more preferably from 1.5:1 to 1.9:1.

In this polyester, the diol having a neo-structure is of considerable importance, and it will provide the bulk of the hydroxy functionality in the polyester. Only a single neo-structured diol has been found to be suitable, namely, 2,2-dimethyl-3-hydroxypropyl-2,2-dimethyl-3-hydroxypropionate which has the formula:

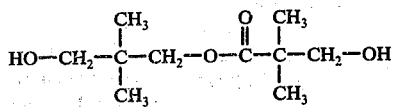

A minor proportion of the hydroxy functionality in the polyester is constituted by a polyhydric alcohol of higher functionality, preferably a triol, especially trimethylol propane. Polyols of higher functionality are also useful, such as pentaerythritol, but four is the highest functionality which provides preferred results. Sorbitol will illustrate polyols of higher functionality.

As previously indicated, the bulk of the hydroxy functionality comes from the neo-structured diol, and the small proportion of hydroxy functionality provided by the polyhydric alcohol component containing at least three hydroxy groups is from 5–25% of the total hydroxy functionality, preferably from 8–20%.

The last component of the polyester is isophthalic acid which may be used alone or together with minor amounts (up to about 25%) of other dicarboxylic acids such as adipic acid, azelaic acid, fumaric acid or maleic acid. Also, up to about 10% of the carboxyl functionality in the polyester may be provided by a monocarboxylic acid, such as benzoic acid. The point to be observed is that the dicarboxylic acid in the polyesters of this invention is essentially isophthalic acid, and other acids may only be present in small amount so as not to upset the dominant characteristics of the isophthalic acid.

The polyesterification reaction is itself conventional, it being normally carried out at a temperature of about 150° C. to 250° C. in the presence of a small amount of inert solvent, such as xylol, to assist in the removal of the water of reaction. The xylol is usually stripped off when the reaction is completed, normally evidenced by an acid number below about 35. The final acid number of the polyester is usually in the range of 8–35.

As previously indicated, the coating compositions of this invention include a liquid polyhydric alcohol and a liquid hexafunctional melamine resin. While it is broadly known to reduce the proportion of volatile organic solvent which is needed by employing a liquid polyhydric alcohol of low volatility, the present invention preferably employs a trihydric or tetrahydric alcohol for rapid cure.

Referring more particularly to the polyhydric alcohol liquids which may be used in the mixture, an average molecular weight of at least about 350, preferably at least 500, is normally utilized to minimize volatilization during the elevated temperature cure. The maximum average molecular weight is determined by the liquidity and viscosity of the polyhydric alcohol, it being preferred to employ an average molecular weight of less than 2000, preferably less than 1000.

The low volatile polyhydric alcohols to be used herein are preferably polyethers formed by reacting a $C_2$–$C_4$ alkylene oxide with a low molecular weight polyhydric alcohol containing from 2–4 hydroxy groups. When the starting polyhydric alcohol is a diol, this provides polyethylene glycol, polybutylene glycol or polypropylene glycol, the latter being preferred when a diol is to be used. Polyoxypropylene ethers are particularly preferred herein regardless of the hydroxy functionality which is desired. Thus, propylene oxide can be adducted with 1,6-hexane diol to provide a liquid polyether which is useful herein.

Turning to higher hydroxy functionalities, the propylene oxide adduct with trimethylol propane is particularly preferred, but a tetrahydric variation based on pentaerythritol is also useful. The corresponding ethylene oxide and butylene oxide adducts are also useful.

The corresponding liquid polyesters made by reacting a lactone with the same starting polyhydric alcohols are also suitable for use herein, though the polyethers are preferred. The preferred available lactone is epsilon caprolactone.

The hexafunctional melamine resin is preferably constituted by hexamethoxymethyl melamine, which is a liquid of relatively low viscosity. Similar products in which all or a portion of the methyl ether is replaced by the ethyl, propyl or butyl ether are also useful.

From the standpoint of proportions, the high solids thermosetting coating solution will contain from about 30 to 70% of the polyester described hereinbefore, from about 10 to 50% of the liquid polyhydric alcohol, and from about 15 to 50% of the liquid melamine resin. The preferred proportions for use herein are 35 to 60% polyester, 20 to 40% melamine resin, and from 20 to 40% of low volatile polyhydric alcohol, most preferably a triol.

The term "high solids" is intended to denote the presence of less than about 30% of volatile organic solvent. In preferred practice, and to obtain low viscosity pigmented solutions, a small amount of volatile organic solvent is included, usually from 10 to 25%. This is much smaller than the 45 to 60% solvent which is usually needed.

The coatings of this invention are normally pigmented to a pigment to binder weight ratio of about 0.3:1 to 1.5:1, preferably from 0.5:1 to 1.3:1. A typical pigmented system in the invention would have a pigment to binder ratio of 1:1, a total solids content of about 80% and possess a room temperature viscosity of about 27 seconds in a #2 Zahn cup.

It is desired to point out that the coating compositions of this invention are liquids which can be applied in any desired fashion, but they are preferably applied by reverse roll coating or coil coating, though container coatings are also important in this invention. It will also be understood that the coatings are thermosetting, and that the thermosetting cure is obtained by the application of heat. Baking temperatures can vary widely from about 250° F. to 550° F., and these temperatures may be employed for periods of time ranging from about 1 hour at the lowest temperatures to about 30 seconds at the highest temperatures. A typical baking schedule is illustrated by placing the coated substrate in an oven heated at a temperature in the range of 400°-500° F. for about 1 minute.

In connection with the baking conditions, it will be appreciated that the primary reaction involved in the cure is the reaction between the N-methylol groups of the melamine resin with the hydroxy groups which are present on both the polyester resin, and the liquid low volatile polyhydric alcohol. This reaction is assisted, as is well known, by the presence of a small amount of an acid catalyst. These acid catalysts are illustrated by p-toluene sulfonic acid, but many others are well known for the purpose.

It will still further be appreciated that numerous auxiliary materials may be present, such as silicone oils and other lubricants, flow control agents, and the like, but these form no part of this invention.

The invention is illustrated in the examples which follow, it being understood that all proportions herein are by weight unless otherwise indicated.

EXAMPLE 1

| parts | |
|---|---|
| 1320 | 2,2-dimethyl-3-hydroxypropyl-2,2-dimethyl-3-hydroxy-propionate |
| 75 | trimethylol propane |
| 470 | isophthalic acid |
| 40 | 2-ethoxy ethanol acetate |

-continued

| parts | |
|---|---|
| 40 | xylol |

The above is charged to a reactor equipped with a condenser and trap, and the trap is set with xylol to remove the water of esterification. The reaction mixture is heated to 220° C. and held at this temperature until the acid value is reduced to 65.

| 410 | isophthalic acid |
|---|---|

The additional acid is added, whereupon the mixture is heated to 225° C. and held at this temperature until an acid valve of 15 is obtained. The product is then allowed to cool, and during cooling the liquid polyhydric alcohol component is mixed in.

| 1500 | polyoxypropylene glycol, average molecular weight = 400 (note 1) |
|---|---|

Cooling is continued to 60° C. whereupon the melamine resin component is added.

| 1500 | hexamethoxymethyl melamine |
|---|---|

The addition of the melamine resin and cooling to room temperature provides the following final characteristics:
solids content = 100%
Gardner viscosity = $Z_3$-$Z_4$
color (Gardner Holdt) = 1
acid value = 6.7
Note 1—Pluracol P-410 may be used.

EVALUATION

The clear liquid product at 100% solids is drawn down on aluminum panels to apply a coating having a dry thickness of 0.7 mil. The wet-applied coating is baked by placing the same in an electric oven at 475° F. for 60 seconds. The following properties are measured
pencil hardness = F
forward impact resistance = pass 60 inch pounds
flexibility ⅛ inch mandrel = excellent
discoloration = none
gloss (60° glossmeter) = 84
solvent resistance = pass 50 MEK rubs
blocking resistance = very good

EXAMPLE 2

Example 1 is repeated with the only change being the use of a different liquid polyhydric alcohol, namely, an adduct of propylene oxide with trimethylol propane having an average molecular weight of 740. The clear product at 100% solids is coated on aluminum panels as in Example 1 and cured for 60 seconds in a 425° F. oven. The film here obtained is harder (2H), with reduced flexibility (pass 1/4 inch mandrel), shows improved solvent resistance (pass 100 MEK rubs), and improved blocking resistance (excellent). The use of the trihydric alcohol in this example not only provided a superior film, as noted above, but the cure took place at a lower temperature.

EXAMPLE 3

The Example 2 liquid mixture is pigmented with titanium dioxide rutile to a pigment to binder weight ratio of 1:1 by slowly adding the pigment to the liquid mixture together with 2-butoxy ethanol solvent in an amount of 20% by weight, based on the total weight of pigment and binder. Agitation in a high speed mixer is used to provide a uniformly pigmented coating composition containing 80% total solids and having a viscosity of 27 seconds in a #2 Zahn cup, ready for reverse roll coat application.

The coating applied well to aluminum coil stock and cures when placed in a 425° F. oven for 60 seconds, reaching a peak metal temperature of 410° F. The cured film was undiscolored, had a pencil hardness of F, resisted 100 methyl ethyl ketone rubs, had a 60° gloss of 91, and passed 40 inch pounds of forward impact. These are excellent properties obtained using a very rapid cure.

The invention is defined in the claims which follow.

I claim:

1. A high solids thermosetting solution coating composition containing less than about 30% of volatile organic solvent consisting essentially of a mixture of:
   (1) an hydroxy functional polyester resin consisting essentially of:
      (A) diol having a neo-structure, said diol being 2,2-dimethyl-3-hydroxypropyl-2,2-dimethyl-3-hydroxypropionate;
      (B) isophthalic acid; and
      (C) a polyhydric alcohol containing at least three hydroxy groups per molecule;
   said polyester having an equivalent ratio of hydroxyl to carboxyl functionalities of from 1.35:1 to 2.0:1 and said polyhydric alcohol containing at least three hydroxy groups providing from 5 to 25% of the total hydroxy functionality in said polyester;
   (2) liquid low volatile polyhydric alcohol containing from 2-4 hydroxy groups and having an average molecular weight of at least about 350; and
   (3) liquid hexafunctional melamine resin;
   said polyester constituting from about 30% to 70% of the mixture, said liquid polyhydric alcohol constituting from about 10 to 50% of the mixture, and said liquid melamine resin constituting from 15 to 50% of the mixture.

2. A coating solution as recited in claim 1 in which the polyhydric alcohol in said polyester is trihydric.

3. A coating solution as recited in claim 2 in which said trihydric alcohol is trimethylol propane.

4. A coating solution as recited in claim 1 in which said liquid low volatile polyhydric alcohol contains 3 or 4 hydroxy groups.

5. A coating solution as recited in claim 1 in which said polyester has an acid number below about 35.

6. A coating solution as recited in claim 5 in which said polyester has an equivalent ratio of hydroxyl to carboxyl functionalities of from 1.5:1 to 1.9:1 and an acid number in the range of 8–35.

7. A coating solution as recited in claim 6 in which said liquid low volatile polyhydric alcohol contains 3 or 4 hydroxy groups and has an average molecular weight of less than 2000.

8. A coating solution as recited in claim 6 in which said liquid low volatile polyhydric alcohol is a triol having an average molecular weight of from 500 to less than 1000.

9. A coating solution as recited in claim 1 in which said coating composition is pigmented to a pigment to binder ratio in the range of 0.3:1 to 1.5:1.

10. A pigmented high solids thermosetting solution coating composition containing from about 10 to about 25% of volatile organic solvent consisting essentially of a mixture of:
   (1) an hydroxy functional polyester resin having an acid number in the range of 8–35 and consisting essentially of:
      (A) diol having a neo-structure, said diol being 2,2-dimethyl-3-hydroxypropyl-2,2-dimethyl-3-hydroxypropionate;
      (B) isophthalic acid and
      (C) trimethylol propane;
   said polyester having an equivalent ratio of hydroxyl to carboxyl functionalites of from 1.5:1 to 1.9:1 and said trimethylol propane providing from 8 to 20% of the total hydroxy functionality in said polyester;
   (2) liquid low volatile polyhydric alcohol containing 3 or 4 hydroxy groups and having an average molecular weight of from about 350 to less than 2000; and
   (3) liquid hexamethoxymethyl melamine resin; said polyester constituting from about 35 to 60% of the mixture, said liquid polyhydric alcohol constituting from about 20 to 40% of the mixture, and said liquid melamine resin constituting from 20 to 40% of the mixture, and said composition being pigmented to a pigment to binder ratio in the range of 0.3:1 to 1.5:1.

11. A coating solution as recited in claim 7 in which said polyhydric alcohol containing 3 or 4 hydroxy groups is a polyether.

12. A coating solution as recited in claim 7 in which said polyhydric alcohol containing 3 or 4 hyroxy groups is a polyester.

13. A coating solution as recited in claim 12 in which said polyester is provided by reacting a polyhydric alcohol with epsilon caprolactone.

* * * * *